United States Patent
Dirac et al.

(10) Patent No.: US 10,163,451 B2
(45) Date of Patent: Dec. 25, 2018

(54) ACCENT TRANSLATION

(71) Applicant: Amazon Technologies, Inc., Seattle, WA (US)

(72) Inventors: Leo Parker Dirac, Seattle, WA (US); Fabian Moerchen, Bainbridge Island, WA (US); Edo Liberty, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/387,038

(22) Filed: Dec. 21, 2016

(65) Prior Publication Data

US 2018/0174595 A1  Jun. 21, 2018

(51) Int. Cl.
  *G10L 21/013* (2013.01)
  *G10L 15/00* (2013.01)
  *G10L 25/51* (2013.01)
  *G06F 17/28* (2006.01)

(52) U.S. Cl.
  CPC .......... *G10L 21/013* (2013.01); *G06F 17/289* (2013.01); *G10L 15/005* (2013.01); *G10L 25/51* (2013.01); *G10L 15/00* (2013.01)

(58) Field of Classification Search
  CPC .............................................. G10L 2021/0135
  See application file for complete search history.

(56) References Cited

U.S. PATENT DOCUMENTS

| | | | | |
|---|---|---|---|---|
| 2004/0148161 A1* | 7/2004 | Das | ......................... | G10L 15/07 704/224 |
| 2007/0038455 A1* | 2/2007 | Murzina | ............... | G10L 15/187 704/263 |
| 2008/0147404 A1* | 6/2008 | Liu | ........................ | G10L 15/005 704/256.2 |
| 2008/0201150 A1* | 8/2008 | Tamura | ................... | G10L 21/00 704/266 |
| 2009/0063156 A1* | 3/2009 | Squedin | .................. | A63F 13/12 704/261 |
| 2009/0094031 A1* | 4/2009 | Tian | ......................... | G10L 21/00 704/251 |
| 2009/0244098 A1* | 10/2009 | Tateishi | ................ | G06T 3/0093 345/646 |
| 2010/0049522 A1* | 2/2010 | Tamura | ................. | G10L 13/033 704/264 |
| 2013/0262119 A1* | 10/2013 | Latorre-Martinez | ... | G10L 13/08 704/260 |

(Continued)

*Primary Examiner* — Douglas Godbold
(74) *Attorney, Agent, or Firm* — Baker & Hostetler LLP

(57) ABSTRACT

Techniques for accent translation are described herein. A plurality of audio samples may be received, and each of the plurality of audio samples may be associated with at least one of a plurality of accents. Audio samples associated with at least a first accent of the plurality of accents may be compared to audio samples associated with at least one other accent of the plurality of accents. A translation model between the first accent and a second accent may be generated. An input audio portion in a first spoken language may be received. It may be determined whether the input audio portion is substantially associated with the first accent, and if so, an output audio portion substantially associated with the second accent in the first spoken language may be outputted based, at least in part, on the translation model.

20 Claims, 11 Drawing Sheets

(56) References Cited

U.S. PATENT DOCUMENTS

| | | | | |
|---|---|---|---|---|
| 2013/0311173 A1* | 11/2013 | Cohen | G10L 21/013 704/207 |
| 2014/0187210 A1* | 7/2014 | Chang | H04W 4/16 455/414.1 |
| 2015/0046158 A1* | 2/2015 | Efrati | G10L 21/003 704/235 |
| 2016/0005403 A1* | 1/2016 | Agiomyrgiannakis | G10L 15/07 704/246 |
| 2016/0019912 A1* | 1/2016 | Barillaud | G10L 25/48 704/224 |
| 2016/0210959 A1* | 7/2016 | Efrati | G10L 21/003 |
| 2016/0379622 A1* | 12/2016 | Patel | G10L 13/06 704/260 |

\* cited by examiner

ACCENT TRANSLATION

BACKGROUND

Many advancements in fields such as technology, transportation, education, and economics have contributed to an increase in verbal communications between individuals from different cities, regions, countries, and other parts of the world. In many cases, even when individuals speak the same language, they may have difficulty understanding one another, for example due to various different accents that may be employed by different speakers. In some cases, individuals that reside, work, or are otherwise associated with a common geographic region or area may assume a common accent. Additionally, in some examples, individuals that learn a second (e.g., non-primary) language may often learn to speak the second language using an accent associated with a primary language. For example, individuals that reside in Germany and primarily speak German may often learn to speak English with a German accent.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
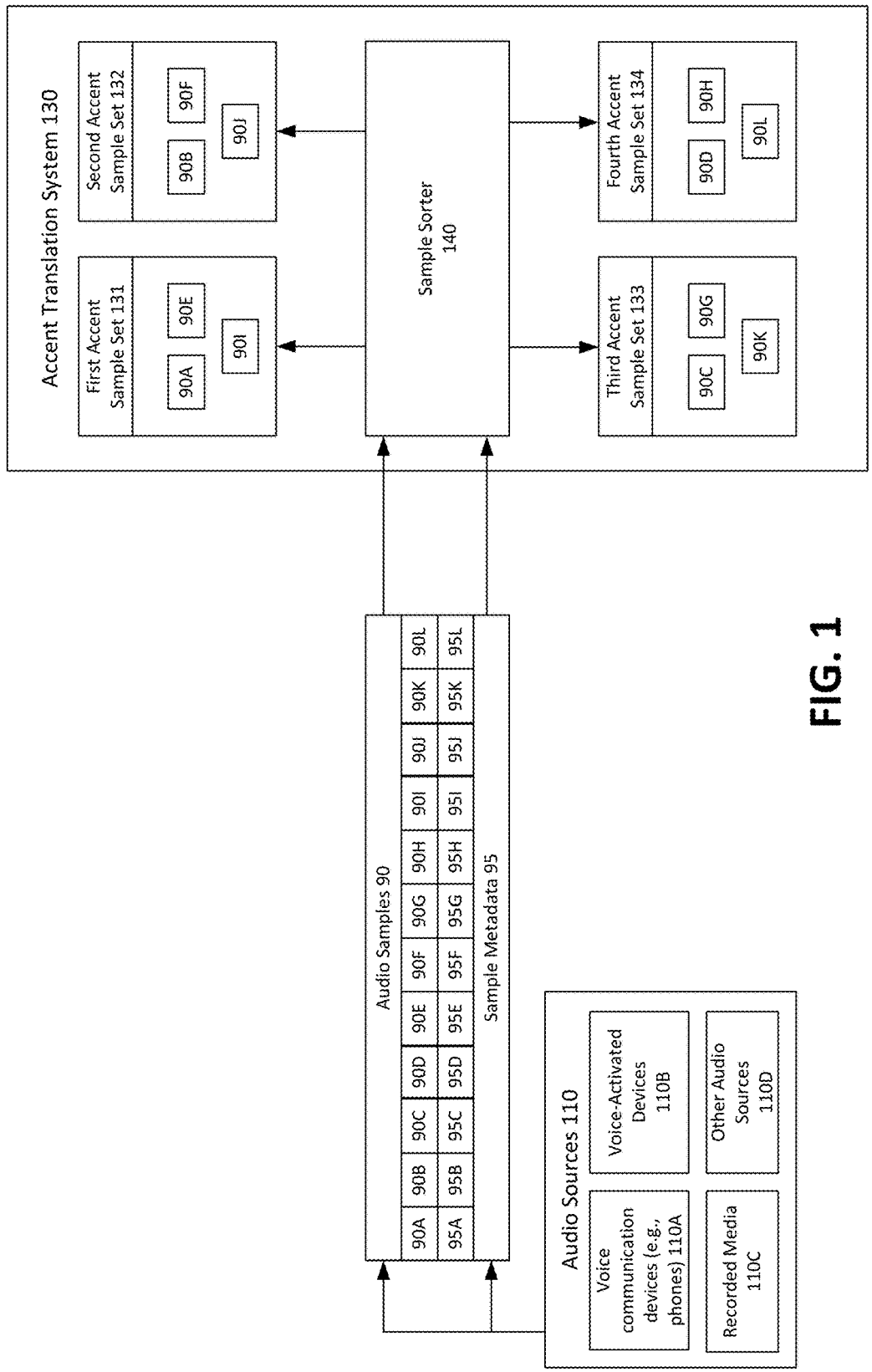
FIG. 1 is a diagram illustrating example accent sample sets that may be used in accordance with the present disclosure.

Techniques for accent translation are described herein. In one embodiment, a number of audio samples may be collected by an accent translation system. In one embodiment, the audio samples may be collected from a variety of different sources, such as audio from phone calls and other voice communication sessions, audio input to voice-activated computing devices, audio from recorded media (e.g., movies, television programs, web and other broadcasts, etc.), and other sources. The collected audio samples may include speech that is spoken in a variety of different accents. In one embodiment, each of the collected audio samples may be classified as being associated with at least one of a plurality of accent sample sets. For example, a first audio sample that includes speech spoken with a German accent may be associated with a German accent sample set, a second audio sample that includes speech spoken with a British accent may be associated with a British accent sample set, a third audio sample that includes speech spoken with a Southern United States (U.S.) accent may be associated with a Southern U.S. accent sample set, and so on.

In one embodiment, the accent translation system may use the collected audio samples to generate one or more accent translation models for translating speech from one accent to another. In particular, in one embodiment, a first accent translation model may be generated for translating speech from a first accent in a first spoken language to a second accent in the first spoken language. For example, the first accent translation model may be used to translate English spoken with a German accent to English spoken with a British accent. In one embodiment, the first accent translation model may be generated by comparing audio samples in an audio sample set corresponding to the first accent against audio samples in an audio sample set corresponding to the second accent. For example, the first accent translation model may be generated by comparing audio samples in a German accent audio sample set to audio samples in a British accent audio sample set. In one embodiment, the comparison of these different audio sample sets against one another may be used to determine differences in various audio characteristics between the sample sets, such as differences in pitch, tone, melody, stress, and other audio characteristics. Additionally, in one embodiment, the first accent translation model may include instructions for translating audio such that audio characteristics associated with the first accent sample set are adjusted to more closely resemble those of the second accent audio sample set. In one embodiment, the accent translation system may continually and/or repeatedly receive new audio samples and use these new audio samples to update and refine the accent translation models, for example by employing machine learning or other algorithm refinement techniques. Additionally, in one embodiment, the generating, updating, and/or refining of the accent translation models may be performed at least in part by one or more artificial neural networks or other systems that may efficiently parse and analyze large amounts of input data.

Additionally, in one embodiment, the accent translation system may use the collected audio samples to determine one or more neutral and/or combined accents. In particular, in one embodiment, a neutral accent may be determined by comparing audio sample sets for a number of different accents and combining their audio characteristics, such as by calculating an average or weighted average of audio characteristic values across the different samples sets, smoothing and/or normalizing audio characteristic values, or otherwise combining audio characteristics. In an alternative embodiment, various audio samples may be identified as neutral audio samples upon being provided to the accent translation system, such as audio samples that are determined by humans to have a neutral accent. Thus, in one embodiment, accent translation models may also be developed for translating speech from a first accent to one or more neutral and/or combined accents.

In one embodiment, the accent translation models may be used to translate input audio from a first accent to a second accent. For example, in one embodiment, a first party and a second part may participate with one another in an audio communication session, such as a phone call. The first party and the second party may speak the same language, but the first party may speak with a first accent, while the second party speaks with a second accent. In one embodiment, the accent translation system may determine that the first party speaks with the first accent and may translate the first party's speech from the first accent to a neutral accent, for example by applying a respective accent translation model for translating speech from the first accent to a neutral accent. In one embodiment, the first party may voluntarily indicate to the accent translation system that he speaks with the first accent. Also, in one embodiment, the accent translation system may determine that the first party speaks with the first accent using data associated with the first party, such as a phone number, geographic location information for a phone or other audio capture device used by the first party, an Internet Protocol (IP) address associated with the first party, and other information. In an alternative embodiment, in addition to determining that the first party speaks with the first accent, the accent translation system may also determine that the second party speaks with the second accent, for example using any of the same of different techniques as may be used to determine the accent of the first party. The accent translation system may then translate the first party's speech from the first accent to the second accent, for example by applying a respective accent translation model for translating speech from the first accent to the second accent.

FIG. 1 is a diagram illustrating example accent sample sets that may be used in accordance with the present disclosure. As shown in FIG. 1, an accent translation system 130 receives audio samples 90A-90L (collectively referred to as audio samples 90) from various audio sources 110. In one embodiment, audio sources 110 include voice communication devices (e.g., phones, computers, etc.) 110A, voice-activated devices 110B, recorded media 110C (e.g., movies, television programs, web and other broadcasts, etc.), and other audio sources 110D. In one embodiment, Audio samples 90 may include samples of audio data including audio of words spoken by various individuals. In one embodiment, accent translation system 130 maintains a number of accent sample sets 131-134 each associated with a respective accent. In one specific example, first accent sample set 131 may be associated with a German accent, second accent sample set 131 may be associated with a British accent, third accent sample set 133 may be associated with a Southern U.S. accent, and fourth accent sample set 134 may be associated with a Northeastern U.S. accent. It is noted that any number of different accent sets may be employed for any number of different accents, including, but not limited to, accents associated different neighborhoods, cities, states, geographic or political regions, countries, ethnic groups, and other groups of people.

In one embodiment, accent translation system 130 includes a sample sorter 140, which may sort each of the incoming audio samples 90 into one or more sample sets 131-134. In the example of FIG. 1, audio samples 90A, 90E and 901 are sorted into first accent sample set 131, audio samples 90B, 90F and 90J are sorted into second accent sample set 132, audio samples 90C, 90G and 90K are sorted into third accent sample set 133, and audio samples 90D, 90H and 90L are sorted into fourth accent sample set 134. In one embodiment, each of the incoming audio samples 90A-90L may have respective associated sample metadata 95A-95L (collectively referred to as sample metadata 95). In one embodiment, sample metadata 95 may include information that may be used by sample sorter 140 to assign each incoming audio sample 90 to one or more appropriate sample sets 131-134. In one embodiment, for audio samples 90 that are captured from phone calls, sample metadata 95 may include information such as one or more phone numbers associated with the call, geographic location information (e.g., global positioning system (GPS) coordinates, etc.) for one or more phones or other devices used to make the call, and other metadata associated with the call. For example, in some cases, if a call is made between two phones having phone numbers with area codes in the Southern U.S., then an audio sample from that call may be assigned to a sample set associated with the Southern U.S. As another example, if a call is made between two phones having GPS coordinates within the Southern U.S., then an audio sample from that call may be assigned to a sample set associated with the Southern U.S.

Additionally, in one embodiment, audio samples 90 may be captured from voice-activated devices 110B, for example when a human instructs the device to perform an action (e.g., play music, provide a weather report, answer a question, etc.), and sample metadata 95 for such audio samples 90 may include, for example, geographic location information for the voice-activated device 110B, an address to which the device 110B is registered, a particular accent that the device 110B may be set to speak with, and other metadata.

In one embodiment, a voice recognition analysis may be employed to identify words spoken within one or more audio samples 90, and the audio samples 90 may be assigned to sample sets 131-134 based, at least in part, or recognized words spoken within the audio samples. In one embodiment, if an audio sample 90 includes words that reference or relate to geographic, social, political, sports, entertainment or other features associated with a particular accent, then, in some cases, the audio sample 90 may be assigned to a sample set associated with the referenced accent. For example, an audio recording in which various German cities (e.g., Berlin, Hamburg, Munich, etc.) are mentioned may sometimes be assigned to a German accent set. As another example, an audio recording in which a number of New York professional sports teams (e.g., Yankees, Mets, Giants, Jets, etc.) are mentioned may sometimes be assigned to a New York accent set.

Furthermore, in one embodiment, humans may voluntarily provide sample metadata 95 that indicates a particular accent with which a respective audio sample 90 is spoken. For example, when two humans participate in a phone call from which an audio sample 90 is obtained, the human participants may voluntarily provide information that identifies their respective accents. Additionally, humans providing commands to a voice-activated device 110B may also voluntarily provide information that identifies their respective accents. In some examples, humans may be provided with compensation or other rewards or incentives to provide audio samples to accent translation system 130 and/or to voluntarily identify their respective accents.

In one embodiment, sample sorter 140 may also use sample metadata 95 to assign a confidence value to each audio sample 90. The confidence value may represent a confidence that the audio sample 90 includes audio with a spoken accent that substantially correlates to an accent corresponding to the sample set to which the audio sample 90 is assigned. In one embodiment, audio samples 90 that are identified by a human as including speech with a particular accent may be assigned a highest confidence value. Additionally, in one embodiment, confidence values may be assigned for other types of sample metadata 95, such as area codes of phone numbers, GPS coordinates or phones and devices, voice recognition analysis, and other metadata.

Figure 2:
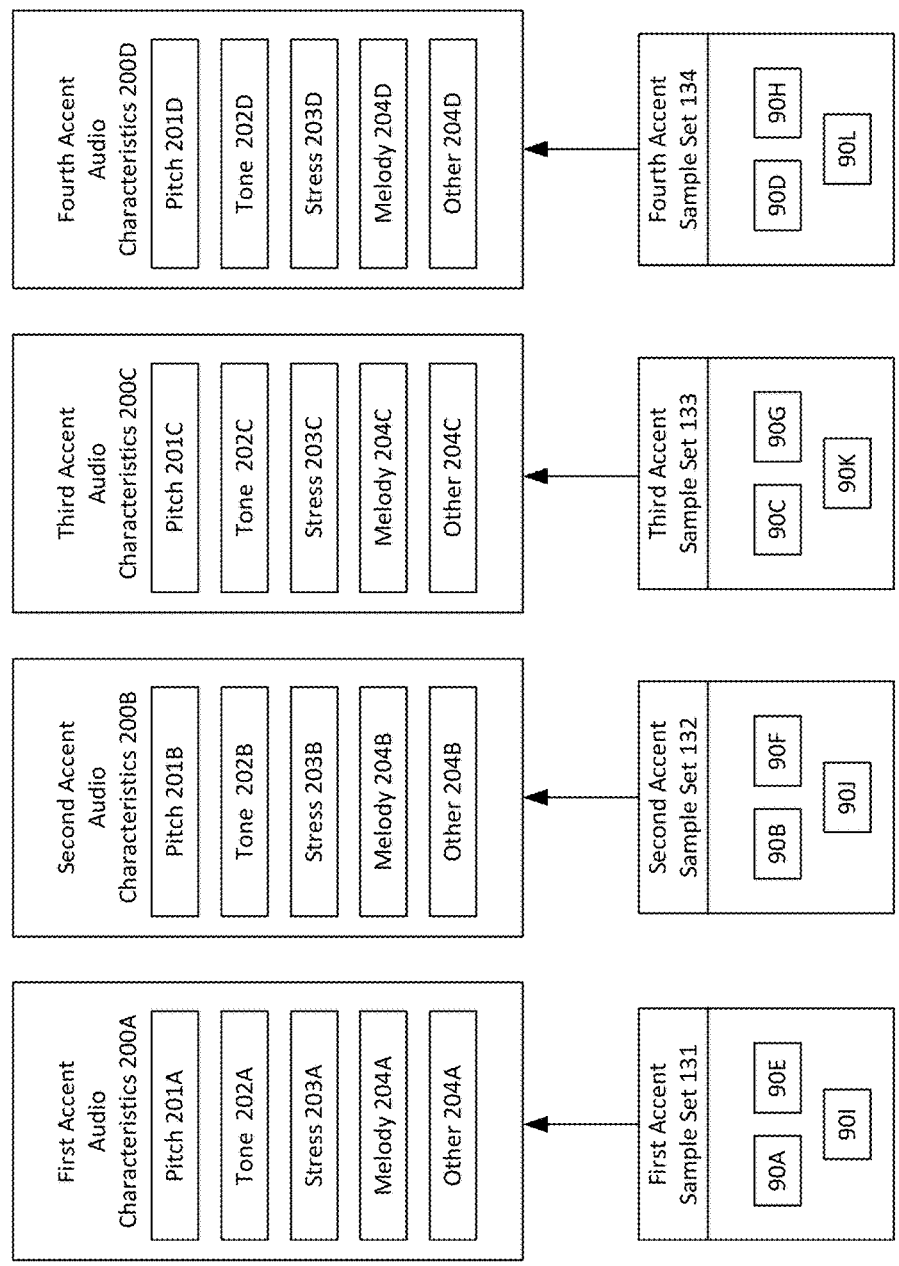
FIG. 2 is a diagram illustrating an example accent audio characteristic analysis that may be used in accordance with the present disclosure.

Referring to FIG. 2, an example accent audio characteristic analysis will now be described in detail. In particular, in one embodiment, the audio samples 90 in each of accent sample sets 131-134 may be analyzed to identify various audio characteristics associated with the respective accent. Specifically, as shown in FIG. 2, first accent audio characteristics 200A relate to first accent sample set 131, second accent audio characteristics 200B relate to second accent sample set 132, third accent audio characteristics 200C relate to third accent sample set 133, and fourth accent audio characteristics 200D relate to fourth accent sample set 134. Each of audio characteristics 200A-200D include respective pitch characteristics 201A-D, tone characteristics 202A-D, stress characteristics 203A-D, melody characteristics 204A-D, and other audio characteristics 205A-D. It is noted that the above audio characteristics are non-limiting examples and that any or all of sample sets 131-134 may be analyzed to obtain any number of the above or other audio characteristics.

In one embodiment, audio characteristics of an audio sample 90 may be determined by performing a fast Fourier transform (FFT) and/or other transformations on the audio sample 90 and then analyzing output of the FFT or other transformations. Additionally, in one embodiment, the analysis of FFT or other transformation output may include determinations of frequency and amplitude of the audio sample 90 in relation to time, such as may be represented using a spectrogram, voiceprint or other representation. Furthermore, in one embodiment, the FFT output may be used to generate Mel-frequency cepstral coefficients (MFCC) or other representations of a sound power spectrum, which may also be used to determine the audio characteristics of an audio sample 90.

In one embodiment, the audio characteristics for an accent may be determined by combining the audio characteristics of the audio samples assigned to a respective sample set. In particular, in one embodiment, attributes of audio characteristics of the audio samples in a respective sample set may be averaged so as to produce overall audio characteristics for the accent. In an alternative embodiment, a weighted average of the attributes of the audio characteristics may be calculated, such as based on the confidence values of the audio samples 90. Specifically, in one embodiment, attributes of audio characteristics from audio samples 90 with a higher confidence value (e.g., a higher confidence that the sample includes speech with the assigned accent) may be weighted more heavily than those from audio samples 90 with a lower confidence value (e.g., a lower confidence that the sample includes speech with the assigned accent). Additionally, in one embodiment, various data smoothing and/or normalizing techniques may be employed, for example to discount or assign a lower weight to audio characteristic attributes that are errors or outside of a determined threshold or relationship to other data samples.

Figure 3:
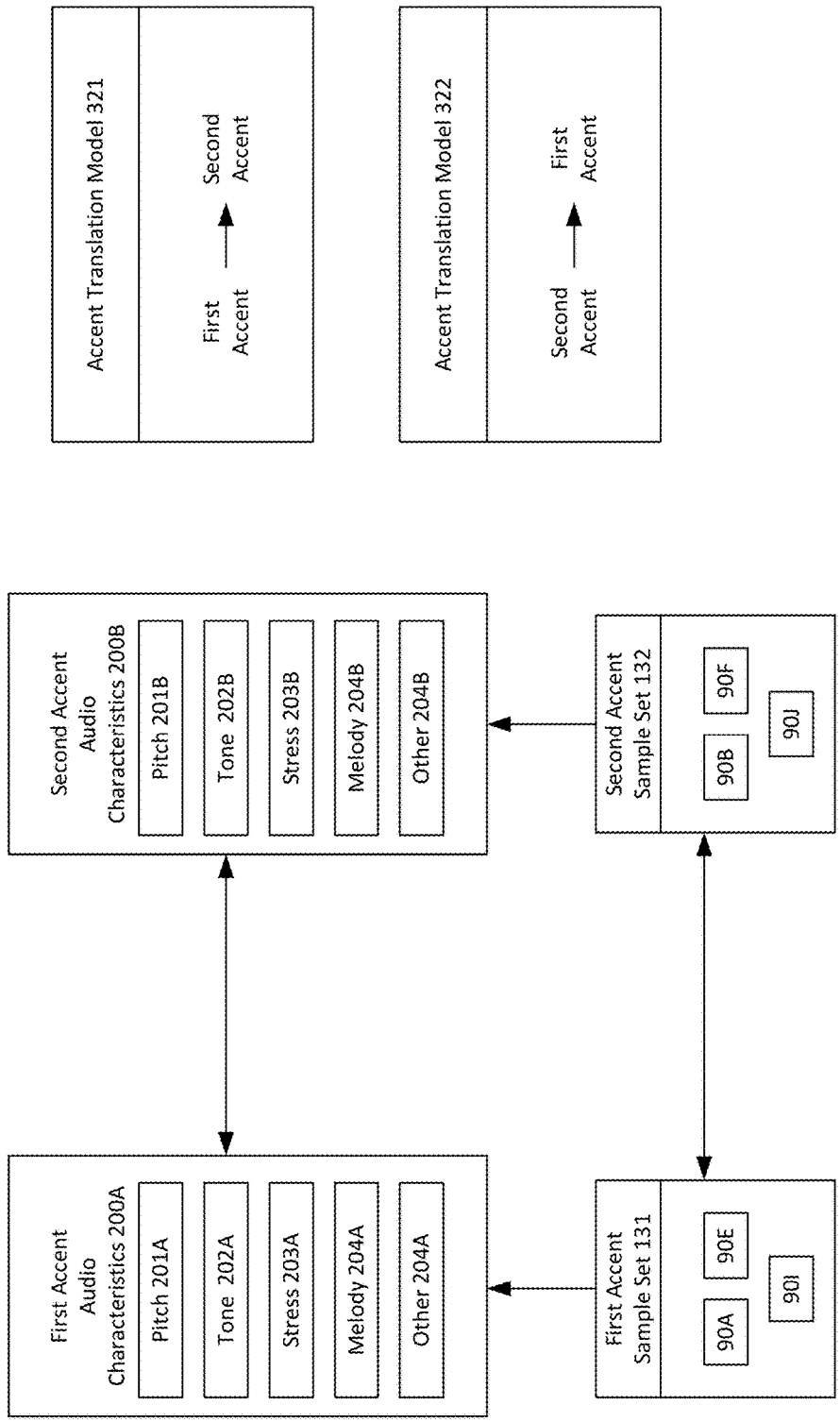
FIG. 3 is a diagram illustrating an example accent sample set comparison that may be used in accordance with the present disclosure.

Referring to FIG. 3, an example accent sample set comparison will now be described in detail. In particular, in one embodiment, different audio sample sets corresponding to different accents may be compared to one another in order to generate translation models for translation of speech between the different accents. In one embodiment, the comparison of different audio sample sets may include a comparison of the different audio characteristics of each accent against one another. Specifically, as shown in FIG. 3, first accent sample set 131 is compared against second accent sample set in order to generate accent translation models 321 and 322. In particular, accent translation model 321 is a model for translating speech from the first accent to the second accent, while accent translation model 322 is a model for translating speech from the second accent to the first accent. For example, in the case where the first accent is German and the second accent is British, accent translation model 321 may enable translation from the German accent to the British accent, while accent translation model 322 may enable translation from the British accent to the German accent.

In one embodiment, the comparison of sample sets 131 and 132 may include a comparison of their respective audio characteristics 200A and 200B. For example, in one embodiment, audio characteristics 200A and 200B may be compared to determine how the first accent pitch 201A differs from the second accent pitch 201B, how the first accent tone 202A differs from the second accent tone 202B, how the first accent stress 203A differs from the second accent stress 203B, how the first accent melody 204A differs from the second accent melody 204B, and so on.

In one embodiment, the accent translation model 321 may then incorporate instructions for adjusting audio characteristics 200A such that they more closely resemble audio characteristics 200B. For example, in one embodiment, accent translation model 321 may include instructions for adjusting first accent pitch 201A to more closely resemble the second accent pitch 201B, adjusting the first accent tone 202A to more closely resemble the second accent tone 202B, adjusting the first accent stress 203A to more closely resemble the second accent stress 203B, adjusting the first accent melody 204A to more closely resemble the second accent melody 204B, and so on. In one embodiment, these instructions may include instructions for adjusting the amplitudes of various frequencies at various times relative to particular portions of speech. For example, consider the scenario in which the first accent tends to employ a higher pitch at the ends of words, while the second accent tends to employ a higher pitch at the beginnings of words. In this scenario, the accent translation model 321 may include instructions shift sound to higher frequencies at times proximate to initiating or resuming speech and to shift sound to lower frequencies at times proximate to stopping or pausing speech. As another example, consider the scenario in which the first accent tends to stress the beginnings of words, while the second accent tends to stress the ends of words. In this scenario, the accent translation model 321 may include instructions shift decrease amplitudes at times proximate to initiating or resuming speech and to increase amplitudes at times proximate to stopping or pausing speech.

In one embodiment, a voice recognition analysis may be performed upon the audio samples in the sample sets 131 and 132 to determine audio characteristics for various letters, phonemes, words, and other units of speech for the first and second accents, respectively. For example, it may be determined that speakers having the first accent tend to speak a particular phoneme with a higher pitch, while speakers having the second accent tend to that same phoneme with a lower pitch. In some examples, the accent translation model 321 may include instructions to decrease pitch whenever this particular phoneme is detected. As yet another example, it may be determined that speakers having the second accent tend to stress a particular combination of letters, while speakers having the first accent do not stress that combination of letters. In some examples, the accent translation model 321 may include instructions to increase amplitude or otherwise cause a stressing of this particular combination of letters.

Figure 4:
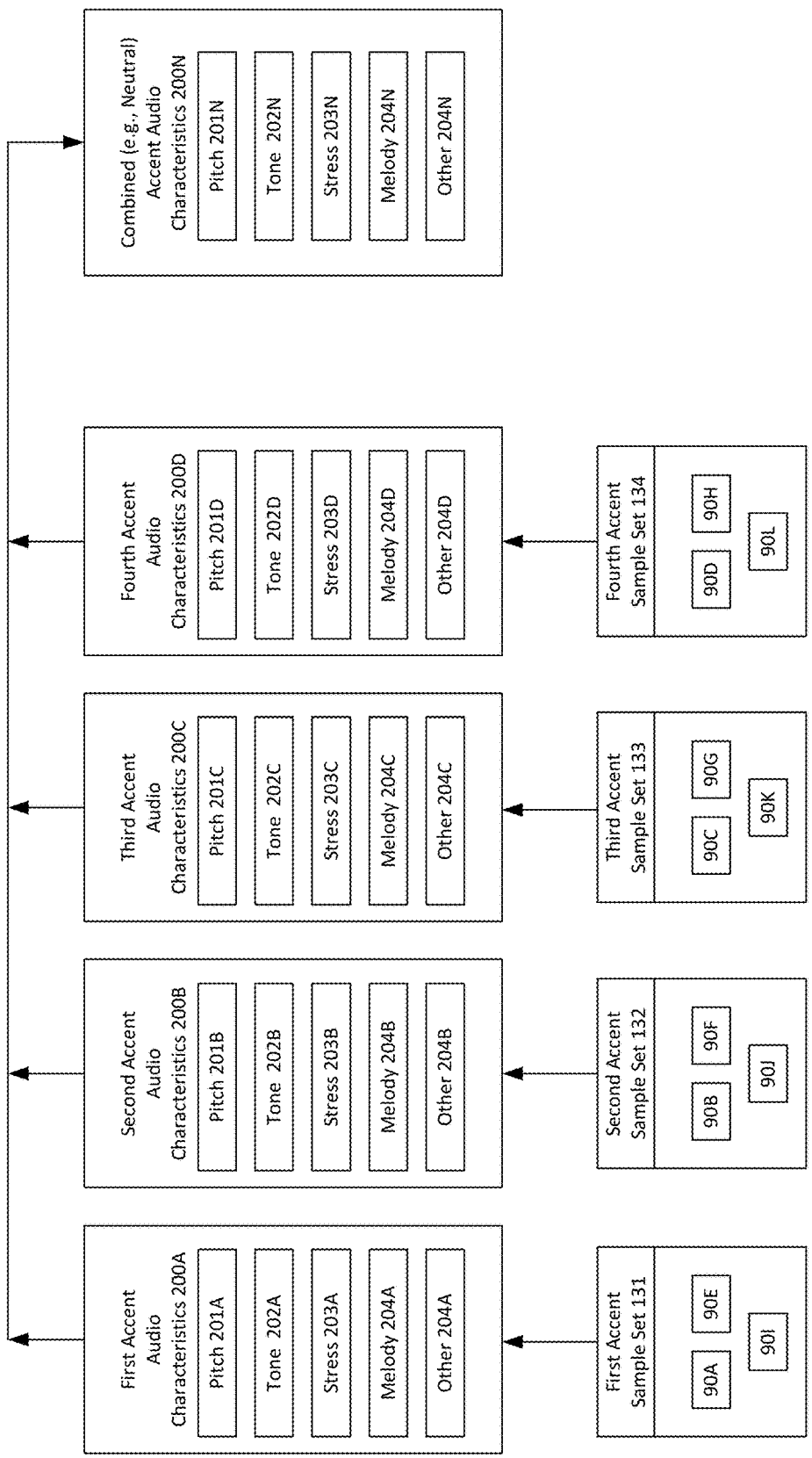
FIG. 4 is a diagram illustrating example audio characteristics for a combined accent that may be used in accordance with the present disclosure.

In one embodiment, the accent translation system 130 may determine various audio characteristics for a neutral accent. In one embodiment, a neutral accent may be a combination of two or more other accents, and, in some cases, may be a combination of each of the different accents for which accent sample sets are maintained by the accent translation system 130. Referring to FIG. 4, example audio characteristics for a combined accent will now be described in detail. In particular, as shown in FIG. 4, audio characteristics 200N are determined for a combined (e.g., neutral) accent. In the example of FIG. 4, combined accent audio characteristics 200N include pitch characteristics 201N, tone characteristics 202N, stress characteristics 203N, melody characteristics 204N, and other characteristics 205N. In one embodiment, the combined accent audio characteristics 200N may be determined by combining audio characteristics 200A-D, such as by calculating an average of attributes of the audio characteristics 200A-D. In one embodiment, a weighted average of the audio characteristics 200A-D may be used, for example to intentionally create a combined accent that more closely resembles some source accents than other source accents. For example, if user wishes to generate a combined accent hat more closely resembles a British accent than a German accent, then this may be achieved by assigned a heavier weight value to British accent audio characteristics than to German accent audio characteristics.

In an alternative embodiment, audio characteristics of a neutral accent may be determined using different techniques. For example, in some cases, humans may designate various audio samples as having a neutral accent, and these audio samples may be assigned to a neutral accent audio sample set and analyzed to determine neutral accent audio characteristics.

Figure 5:
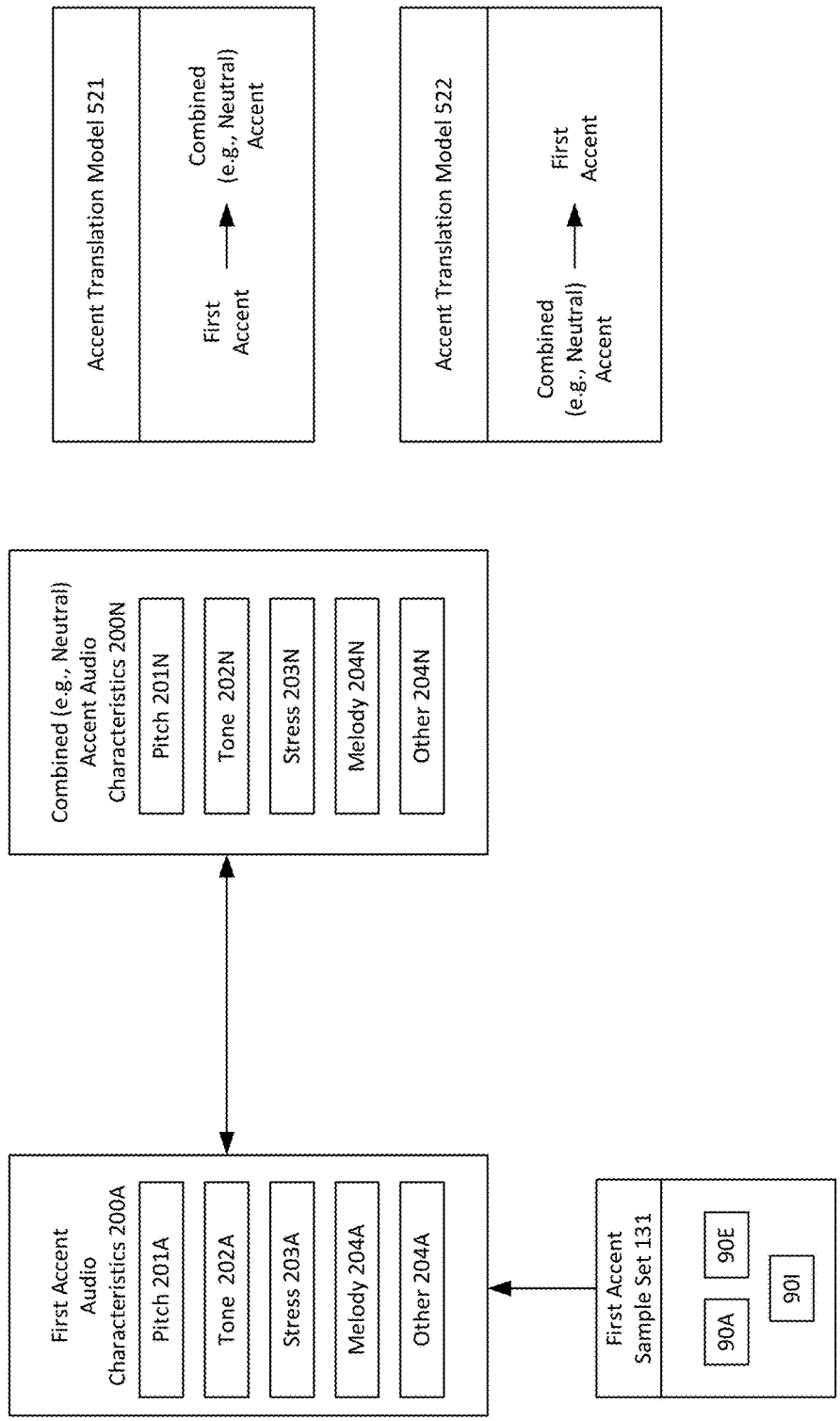
FIG. 5 is a diagram illustrating an example combined accent comparison that may be used in accordance with the present disclosure.

Referring now to FIG. 5, an embodiment is illustrated in which first accent audio characteristics 200A are compared against combined accent audio characteristics 200N in order to generate accent translation models 521 and 522. In particular, accent translation model 521 is a model for translating speech from the first accent to the combined accent, while accent translation model 522 is a model for translating speech from the combined accent to the first accent. In one embodiment, accent models 521 and 522 may be generated using any or all of the various translation model generation techniques described in detail above, such as with respect to translation models 321 and 322 of FIG. 3.

In one embodiment, the accent translation system 130 includes one or more artificial neural networks, such as a long short-term memory (LSTM) architecture or other systems that may efficiently parse and analyze large amounts of input data. In one embodiment, the accent translation system 130 may continually and/or repeatedly receive new audio samples and use these new audio samples to update and refine the accent translation models, for example by employing machine learning or other associated techniques.

Figure 6:
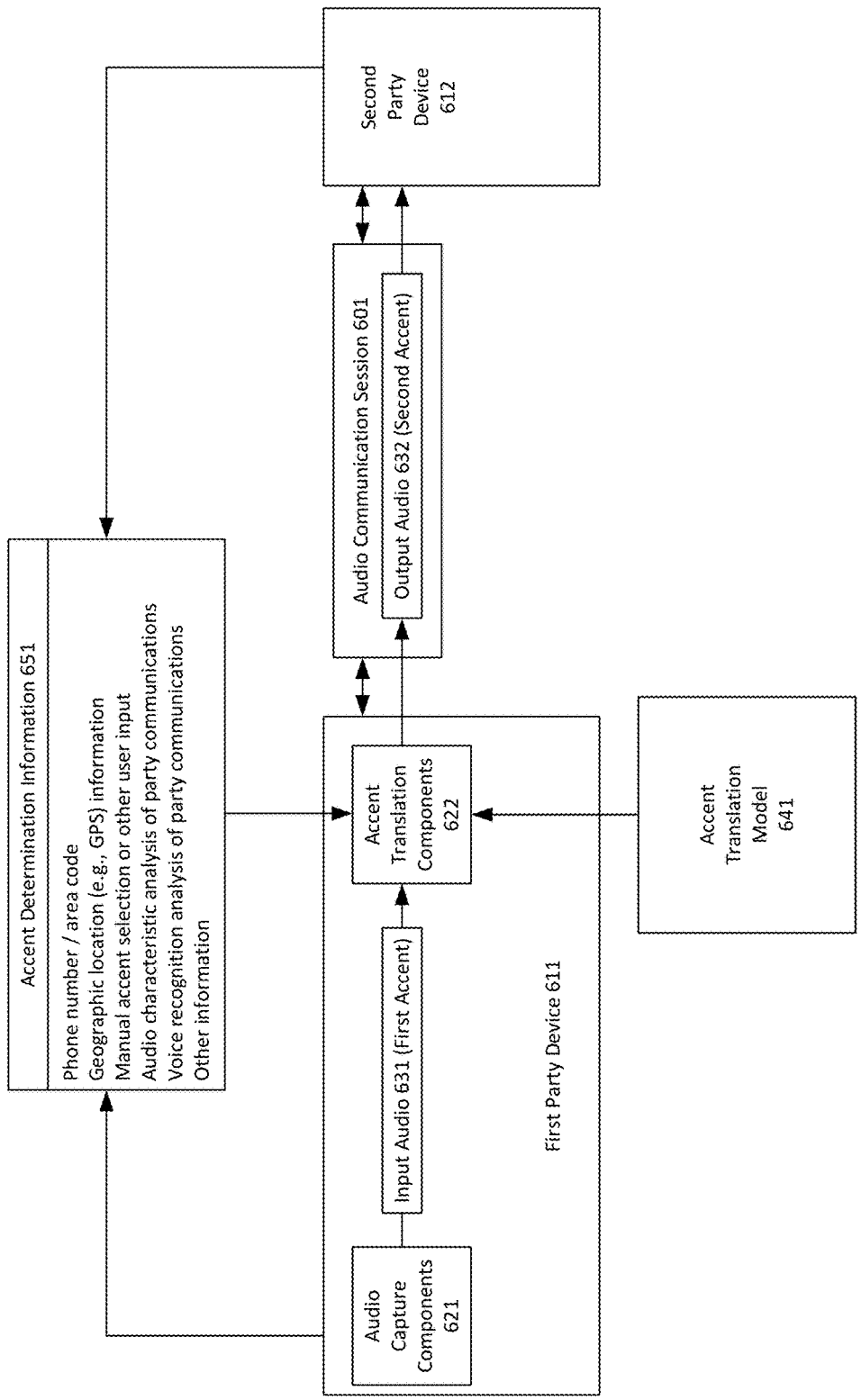
FIG. 6 is a flowchart illustrating an example accent translation architecture that may be used in accordance with the present disclosure.

Referring to FIG. 6, an example accent translation architecture will now be described in detail. In particular, in one embodiment, a first party and a second party may participate in an audio communication session 601, for example between first device 611 and second party device 612. In one embodiment, audio communication session 601 may be a phone call, and devices 611 and 612 may be phones and/or phone-enabled computing devices. Audio communication session 601 is not limited to phone calls and may include other types of audio communications, such as Voice over Internet Protocol (VoIP) and other voice and/or audio transmission protocols, for example for transmitting data over a phone or cellular network, a local area network (LAN), and/or a wide area network (WAN) such as the Internet. In various alternative embodiments, the accent translation techniques described herein may be used in other scenarios, such as to translate the accent of a live speaker or presenter to an audience, to translate accents during playback of live or recorded media content (e.g., music, movies, television programs, etc.), to translate the accent of computer-generated speech, and in many other scenarios.

In the embodiment illustrated in FIG. 6, accent translation components 622 within first party device 611 are employed to translate speech spoken by the first party from a first accent to a second accent. In particular, speech spoken by the first party may be captured by audio capture components 621, such as a microphone. This captured speech may then be provided to accent translation components 622 as input audio 631. Accent translation components 622 may then translate the input audio 631 from the first accent to output audio 632 in the second accent. Input audio 631 and output audio 632 may remain in the same language as one another. It is noted that there is no requirement that accent translation components 622 must be included on the first party device 611. For example, in an alternative embodiment, accent translation components may be located on the second party device 612 or on one or more other devices that may be local and/or remote with respect to devices 611 and/or 612.

In one embodiment, accent translation components 622 may receive and use accent determination information 651, for example to determine the first accent in which the first party speaks. In one embodiment, the first party and/or the second party may provide user input that indicates the first party's accent, such as by manually selecting the first accent from a list of available accents or via other user input. Also, in one embodiment, a phone number and/or area code of the first party device 611 (and/or an Internet Protocol (IP) or other address of the first party device 611) may be used to determine the first party's accent. For example, if the first party device 611 has a phone number or area code corresponding to Germany, then this may indicate that first party speaks with a German accent. Additionally, in one embodiment, geographic location (e.g., global positioning system (GPS)) information for the first party device 611 may be used to determine the first party's accent. For example, if the first party device 611 has associated GPS coordinates corresponding to a location in Germany, then this may indicate that first party speaks with a German accent.

Furthermore, in one embodiment, an audio characteristic analysis of audio communications by the first party may be used to determine the first party's accent, such as audio communications from audio communications session 601 (including the input audio 631) and/or prior audio communications by the first party. For example, in some cases, audio communications from the first party may be analyzed to obtain audio characteristics (e.g., pitch, tone, stress, melody, etc.) of the first party's accent, such as using any of the audio characteristic analysis techniques described above (e.g., fast Fourier transform (FFT), Mel-frequency cepstral coefficients (MFCC), etc.). The audio characteristics of the first party's accent may then be compared to audio characteristics of various accent sample sets (e.g., audio characteristics 200A-D of accent sample sets 131-134 FIG. 2) to determine an accent set and an accent to which the first party's accent substantially correlates.

Additionally, in one embodiment, a voice recognition analysis of audio communications by the first party may be used to determine the first party's accent, such as audio communications from audio communications session 601 and/or prior audio communications by the first party. For example, if the first party's communications include words that reference or relate to geographic, social, political, sports, entertainment or other features associated with a particular accent, then this may indicate that the first party speaks with this accent. For example, communications in which various German cities are mentioned may indicate that the first party speaks with a German accent.

In one embodiment, in addition or as an alternative to determining the first accent in which the first party speaks, accent determination information 651 may also be used to determine the second accent to which to translate the output audio 632. In one embodiment, the first party and/or the second party may provide user input that indicates the second accent, such as by manually selecting the second accent from a list of available accents or via other user input. Additionally, in one embodiment, accent determination information may 651 may be used to determine an accent that the second party is likely to speak with, and this accent may then be used as the second accent to which the first party's speech is translated. Accordingly, in one embodiment, the second accent may be determined based on the above described or other device information associated with the second party device 612 (e.g., phone number, area code, IP address, GPS information, etc.) that may indicate an accent of the second party. Furthermore, in one embodiment, the second accent may be determined based on an audio characteristic analysis and/or a voice recognition analysis of audio communications from the second party, for example using techniques such as those described with respect to determination of the first accent from audio communications of the first party.

In one embodiment, upon determining the first accent spoken in the input audio 631 and the second accent to which to translate the output audio 632, accent translation components 622 may select, an appropriate accent translation model 641 for translating the first accent of input audio 631 to the second accent of output audio 632. In one embodiment, the accent translation model 641 may be used to adjust audio characteristics of the input audio 631, such as pitch, tone, stress, melody and others, from audio characteristics that correspond to the first accent to audio characteristics that more closely resemble those of the second accent. In one embodiment, the adjustment of the audio characteristics of the input audio 631 may be performed by calculating a fast Fourier transform (FFT), mel-frequency cepstral coefficients (MFCC), and/or other transformations of the input audio 631 and adjusting the audio characteristics of the input audio portion based, at least in part, on a comparison of the accent translation model and the output of the calculated transformations. For example, in one embodiment, the output of the calculated transformations may be used to determine if, and to what extent, to adjust various parts of the input audio portion. In one embodiment, certain parts of the input audio portion that may more closely resemble the second accent may require fewer (if any) adjustments in comparison to other parts of the input audio portion that may less closely resemble the second accent and may require more substantial adjustments.

In one embodiment, accent translation components 622 may perform a voice recognition analysis on input audio 631 to identify various letters, phonemes, words, and other units of speech within input audio 631. In one embodiment, the accent translation model 641 may include specific instructions for adjusting audio characteristics for portions of the input audio in which various particular letters, phonemes, words, and other units of speech are identified. For example, it may be determined that speakers having the first accent tend to speak a particular phoneme with a higher pitch, while speakers having the second accent tend to that same phoneme with a lower pitch. In some examples, the accent translation model 641 may include instructions to decrease pitch whenever this particular phoneme is detected.

Figure 7:
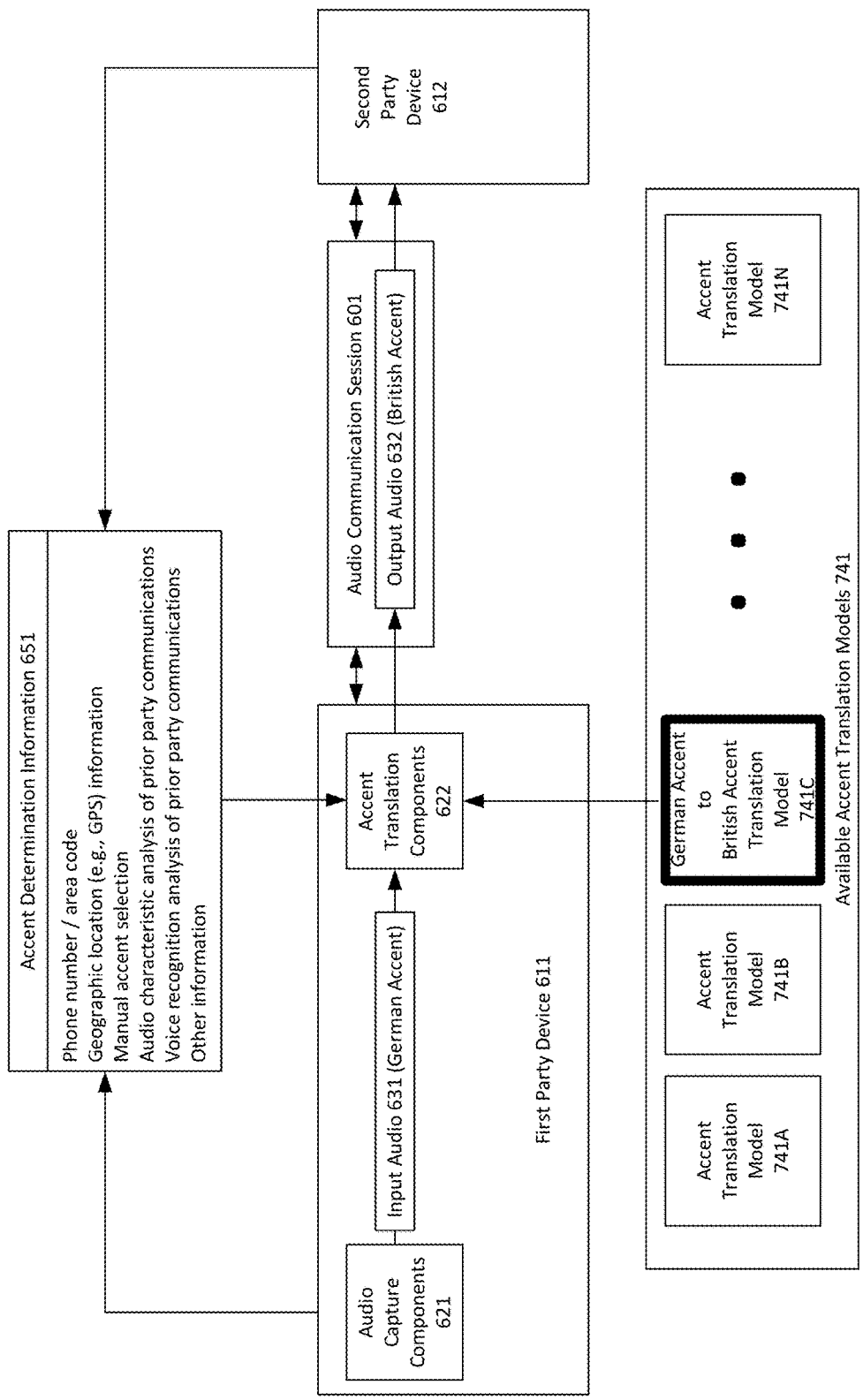
FIG. 7 is a diagram illustrating a first example accent translation that may be used in accordance with the present disclosure.

In one embodiment, the accent translation model 641 that is used for this translation may be selected from a group of accent translation models determined by accent translation system 130 of FIG. 1. In particular, FIG. 7 depicts an example in which input audio 631 is spoken in a German accent that is translated to a British accent in output audio 632. Additionally, in the embodiment illustrated in FIG. 7, accent translation components 622 have selected a German accent to British accent translation model 741C for translation of the input audio 631 to the output audio 632. Furthermore, in the embodiment illustrated in FIG. 7, accent translation components 622 have selected German accent to British accent translation model 741C from a collection of available accent translation models 741 including accent translation models 741A-N.

Figure 8:
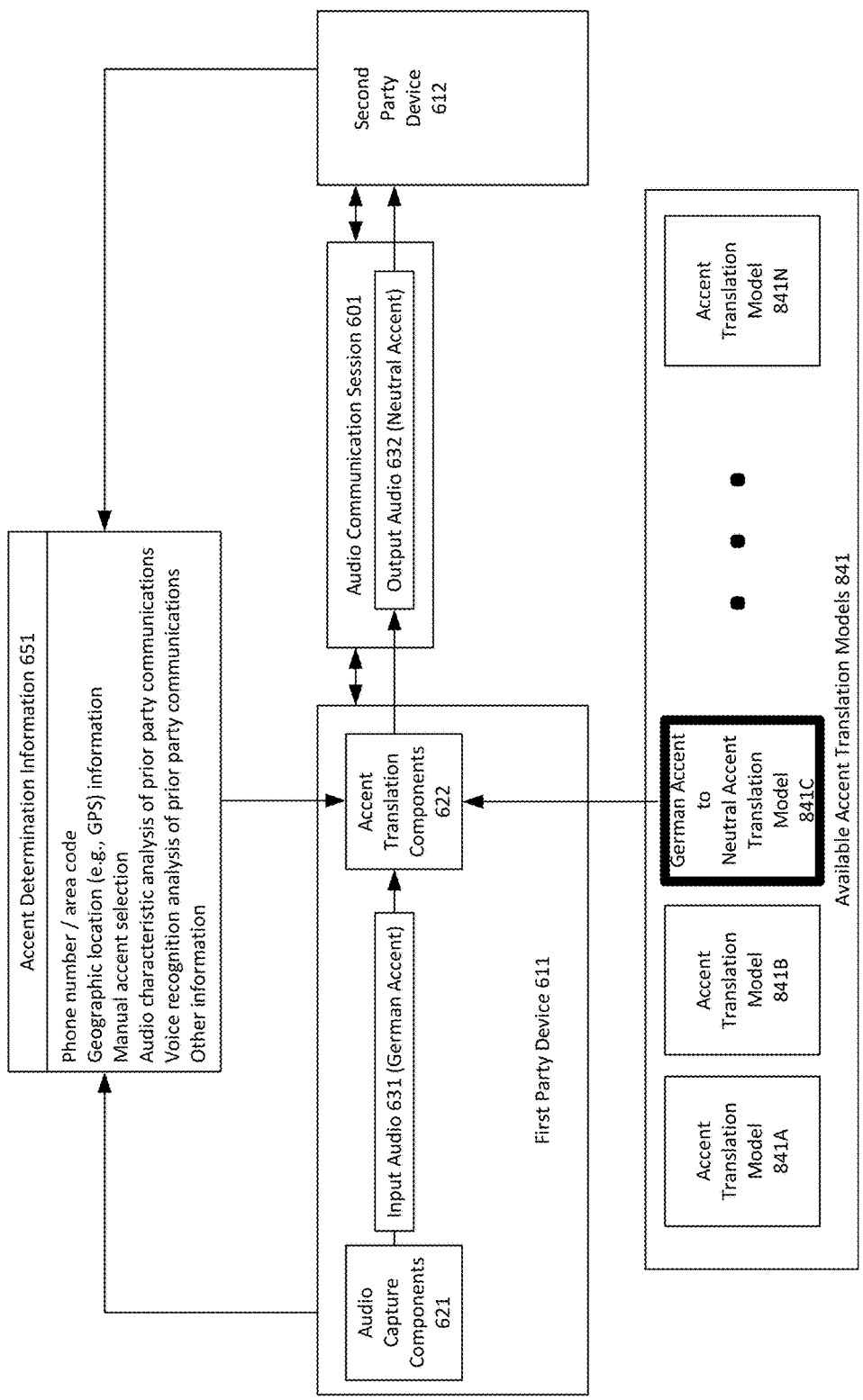
FIG. 8 is a diagram illustrating a second example accent translation that may be used in accordance with the present disclosure.

As set forth above, in one embodiment, input audio spoken in a first accent may be translated into a neutral accent, such as a combination of two or more other accents. FIG. 8 depicts an example in which input audio 631 is spoken in a German accent that is translated to the neutral accent in output audio 632. Additionally, in the embodiment illustrated in FIG. 8, accent translation components 622 have selected a German accent to neutral accent translation model 841C for translation of the input audio 631 to the output audio 632. Furthermore, in the embodiment illustrated in FIG. 8, accent translation components 622 have selected German accent to neutral accent translation model 841C from a collection of available accent translation models 841 including accent translation models 841A-N.

It is noted that, while FIGS. 6-8 depict translation of an accent in speech spoken by the first party, the accent translation techniques described herein may also be used, in a similar manner, to translate an accent in speech spoken by the second party. Moreover, it is further noted that the accent translation techniques may also be used in phone calls or other audio communication sessions involving more than two parties. For example, speech spoken by the first party could be translated, for example in parallel or partially in parallel, to multiple different accents associated with multiple different other parties connected to the audio communication session.

Figure 9:
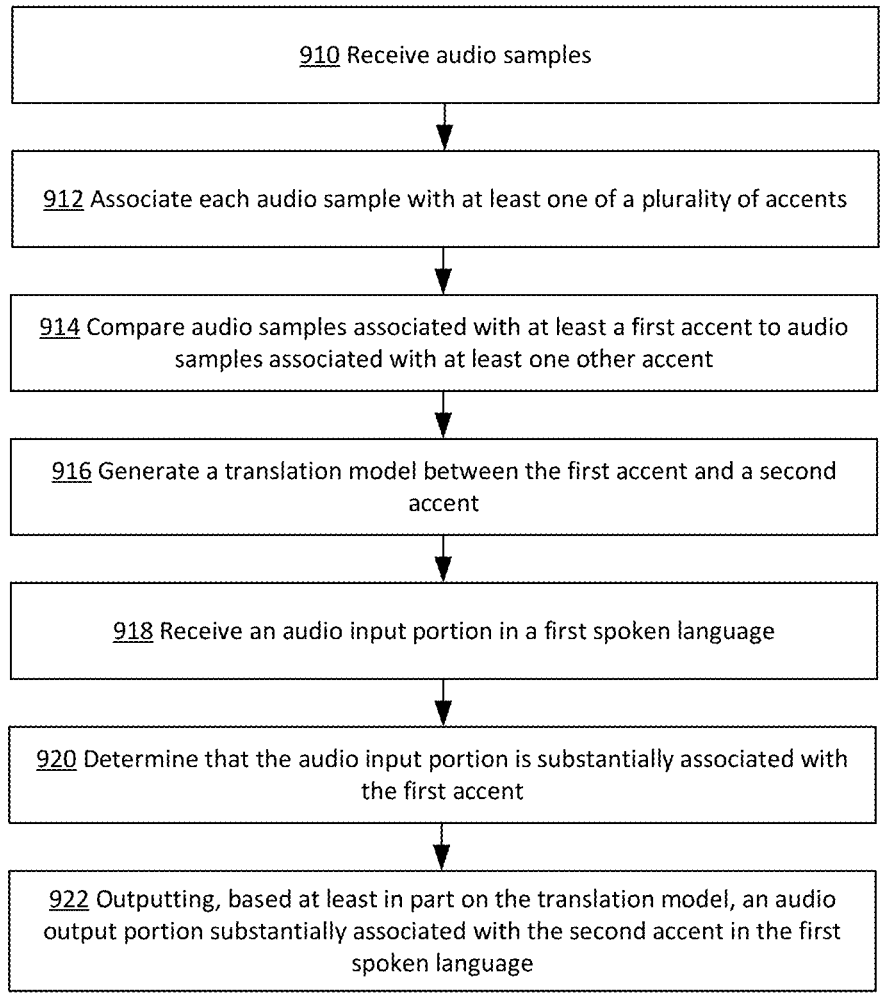
FIG. 9 is a diagram illustrating an example accent translation process that may be used in accordance with the present disclosure.

FIG. 9 is a diagram illustrating an example accent translation process that may be used in accordance with the present disclosure. At operation 910, audio samples, such as audio samples 90 of FIG. 1, are received, for example by an accent translation system 130 of FIG. 1. In one embodiment, the audio samples may be collected from a variety of audio sources, such as voice communication devices (e.g., phones, computers, etc.), voice-activated devices, recorded media (e.g., movies, television programs, web and other broadcasts, etc.), and other audio sources. In one embodiment, the audio samples may include samples of audio data including audio of words spoken by various individuals.

At operation 912, each of the audio samples is associated with at least one of a plurality of accents. In one embodiment, an accent translation system may maintain a number of accent sample sets each associated with a respective accent. Additionally, in one embodiment, the accent translation system may sort each of the incoming audio samples into one or more sample sets. Furthermore, in one embodiment, each of the audio samples may have respective associated sample metadata that may include information for assigning each audio sample to one or more appropriate sample sets. For example, the sample metadata may include information such as one or more phone numbers associated with a respective audio sample, geographic location information (e.g., GPS coordinates, etc.) associated with a respective audio sample, a voice recognition analysis and/or an indication of words spoken within a respective audio sample, user input that indicates a particular accent with which a respective audio sample is spoken, and other information.

At operation 914, audio samples associated with at least a first accent of the plurality of accents are compared to audio samples associated with at least one other accent of the plurality of accents. In one embodiment, the comparison of audio samples at operation 912 may include determining various audio characteristics associated with each of the plurality of accents, such as pitch, tone, stress, melody, and other audio characteristics. The comparison of audio samples at operation 912 may also include comparing the audio characteristics of at least the first accent to audio characteristics of the at least one other accent. In one embodiment, the audio characteristics for an accent may be determined based, at least in part, on the audio characteristics of the audio samples assigned to a respective sample set or otherwise associated with the accent. In one embodiment, the audio characteristics of an audio sample may be determined by performing a fast Fourier transform (FFT), generating, generating Mel-frequency cepstral coefficients (MFCC) and/or performing other transformations and then analyzing output of those transformations.

At operation 916, a translation model between the first accent and a second accent is generated. In one embodiment, the first accent and/or the second accent may include a neutral accent, a modification of one or more other accents, and/or a combination of two or more other accents. In one embodiment, the accent translation model may be determined, at least in part, by one or more artificial neural networks. Additionally, in one embodiment, the translation model may be generated based, at least in part, on a comparison of audio samples and/or audio characteristics associated with at least the first accent to audio samples and/or audio characteristics associated with at least one other accent, such as the second accent and/or accents from which the second accent may be derived. In one embodiment, the accent translation model may incorporate instructions for adjusting audio characteristics of the first accent such that they more closely resemble audio characteristics of the second accent. For example, in one embodiment, the accent translation model may include instructions for adjusting a first accent pitch, tone, stress, melody, and/or other audio characteristics to more closely resemble the second accent pitch, tone, stress, melody, and/or other audio characteristics.

At operation 918, an input audio portion in a first spoken language is received. In one embodiment, the audio input may include audio spoken by a first party during an audio communication session (e.g., phone call, VoIP session, etc.) between the first party and a second party. In one embodiment, the input audio portion may be captured by an audio capture device (e.g. microphone) and then received by accent translation components such as accent translation components of FIG. 6.

At operation 920, it is determined that the audio input portion is substantially associated with the first accent. In one embodiment, accent translation components 622 may first attempt to determine whether the audio input portion is substantially associated with the first accent. If so, then the process may proceed to operation 922. If not, then the accent translation components 622 may evaluate other accents until an accent with which the input audio portion is substantially associated is determined or an accent for the audio input portion is otherwise selected. In one embodiment, an accent with which the input audio portion is substantially associated may be determined based, at least in part, on accent determination information 651 of FIG. 1, such a phone number, a geographic location information (e.g., GPS coordinates, etc.), or other information associated with a phone or other device that captures the input audio portion, an audio characteristic and/or voice recognition analysis of audio communications from the first party, user input that indicates an accent with which the input audio portion is substantially associated, and other information. For example, in one embodiment, the input audio portion may be determined to be substantially associated with the first accent by at least partially matching one or more audio characteristics of the input audio portion (and/or other first party communications) to one or more audio characteristics of audio samples associated with the first accent. Additionally, in one embodiment, a fast Fourier transform (FFT), mel-frequency cepstral coefficients (MFCC), and/or other transformations associated with the audio input portion and/or other first party communications may be calculated to identify one or more audio characteristics of the audio input portion and/or other first party communications.

Additionally, in one embodiment, an accent to which to translate the input audio portion (e.g., the second accent) may also be determined based, at least in part, on accent determination information 651 of FIG. 1, such a phone number, a geographic location information (e.g., GPS coordinates, etc.), or other information associated with a phone or other device associated with the second party, an audio characteristic and/or voice recognition analysis of audio communications from the second party, user input that indicates an accent spoken by the second party, and other information. For example, in one embodiment, a determination to translate the input audio portion to the second accent may be based on at least partially matching one or more audio characteristics of second party communications to one or more audio characteristics of audio samples associated with the second accent.

At operation 922, an output audio portion substantially associated with the second accent in the first spoken language (i.e., the same spoken language as the input audio portion) is outputted based, at least in part, on the accent translation model. In one embodiment, the output audio portion may be played to the second party during the audio communication session between the first party and the second party. In one embodiment, the outputting performed at operation 922 may include adjusting at least one of pitch, tone, stress, melody, or other audio characteristics of at least part of the input audio portion. In particular, the accent translation model may be used to adjust audio characteristics of the input audio from audio characteristics that correspond to the first accent to audio characteristics that more closely resemble those of the second accent. In one embodiment, the adjustment of the audio characteristics of the input audio portion may be performed by calculating a fast Fourier transform (FFT), mel-frequency cepstral coefficients (MFCC), and/or other transformations of the input audio portion and adjusting the audio characteristics of the input audio portion based, at least in part, on a comparison of the accent translation model and the output of the calculated transformations. For example, in one embodiment, the output of the calculated transformations may be used to determine if, and to what extent, to adjust various parts of the input audio portion. Additionally, in the outputting of the output audio portion may include performing a voice recognition analysis on the input audio portion to identify various letters, phonemes, words, and other units of speech within the input audio portion. In one embodiment, the accent translation model may include specific instructions for adjusting audio characteristics for portions of the input audio in which various particular letters, phonemes, words, and other units of speech are identified.

Figure 10:
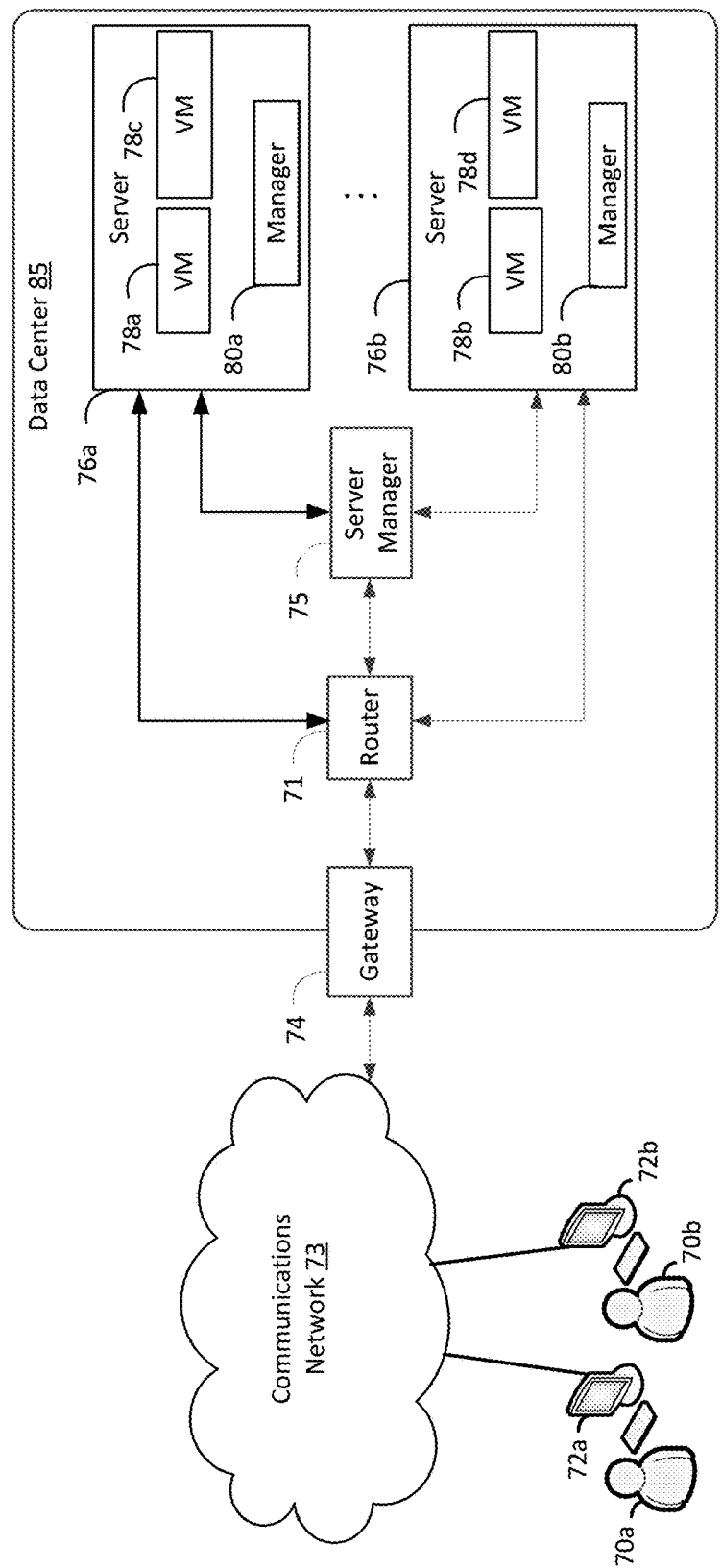
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
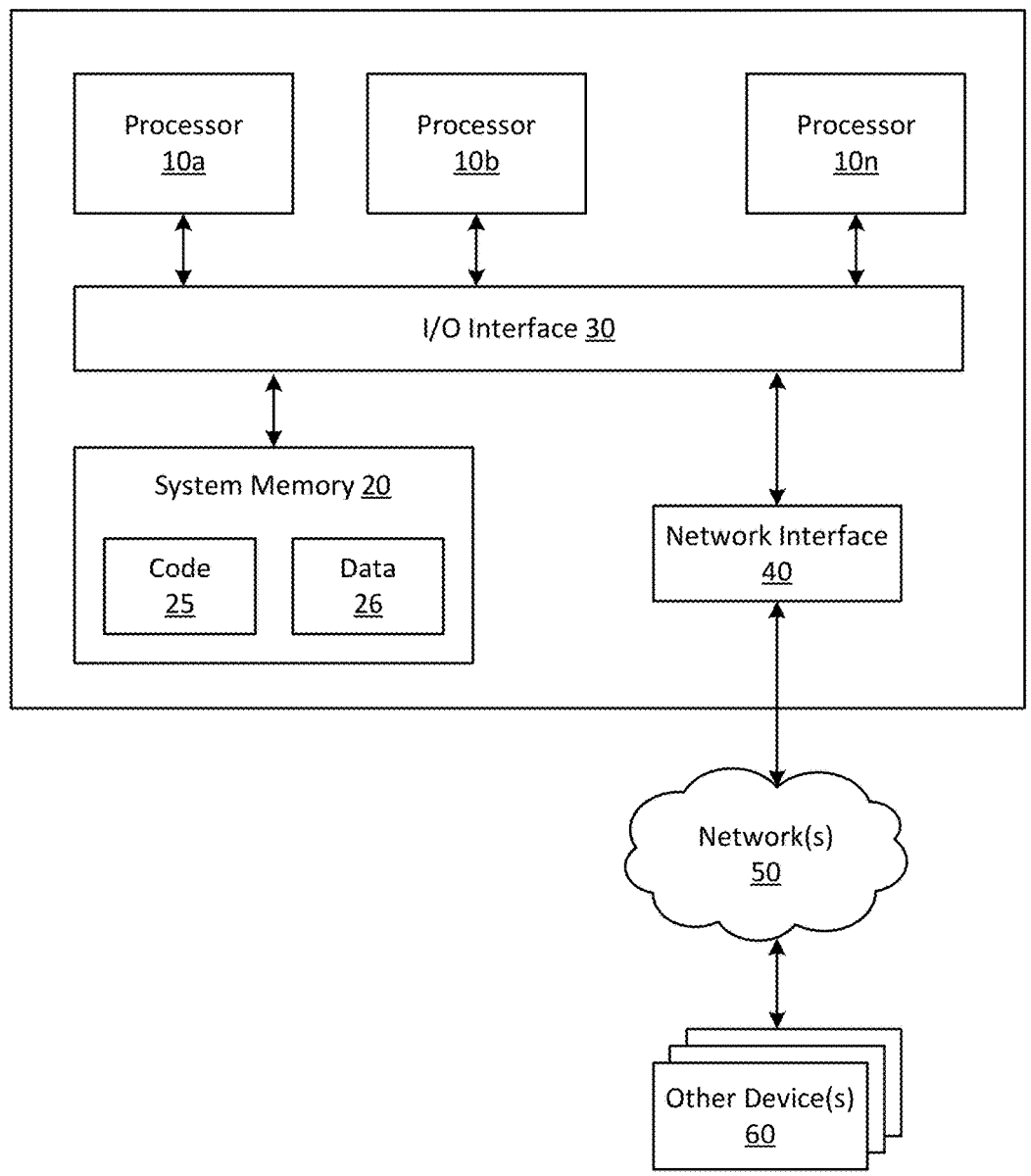
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more processors
   one or more memories to store a set of instructions, which if executed by the one or more processors, causes the one or more processors to perform operations comprising:
     receiving a plurality of audio samples;
     associating each of the plurality of audio samples with at least one of a plurality of accents;
     determining first combined audio characteristics of a first accent of the plurality of accents by combining first sample audio characteristics of audio samples associated with the first accent;
     determining second combined audio characteristics of a second accent of the plurality of accents by combining second sample audio characteristics of audio samples associated with the second accent;
determining third combined audio characteristics of a third accent by combining the first combined audio characteristics of the first accent and the second combined audio characteristics of the second accent;
comparing the third combined audio characteristics of the third accent to other audio characteristics associated with at least one other accent of the plurality of accents;
generating a translation model between a fourth accent and the third accent;
receiving an input audio portion in a first spoken language; and
determining whether the input audio portion is substantially associated with the fourth accent, and if so, outputting, based at least in part on the translation model, an output audio portion substantially associated with the third accent in the first spoken language.

2. The system of claim 1, wherein the third accent includes a neutral accent.

3. The system of claim 1, wherein the outputting comprises adjusting at least one of pitch, tone, stress, or melody of at least part of the input audio portion.

4. The system of claim 1, wherein the input audio portion includes audio spoken by a first party during an audio communication session between the first party and a second party, and wherein the output audio portion is played to the second party during the audio communication session.

5. A method comprising:
determining first combined audio characteristics of a first accent by combining first sample audio characteristics of audio samples associated with the first accent;
determining second combined audio characteristics of a second accent by combining second sample audio characteristics of audio samples associated with the second accent;
determining third combined audio characteristics of a third accent by combining the first combined audio characteristics of the first accent and the second combined audio characteristics of the second accent;
comparing the third combined audio characteristics of the third accent to other audio characteristics associated with one or more other accents;
generating a translation model between a fourth accent and the third accent;
receiving an input audio portion substantially associated with the fourth accent in a first spoken language; and
outputting, based at least in part on the translation model, an output audio portion substantially associated with the third accent in the first spoken language.

6. The method of claim 5, further comprising determining that the input audio portion is substantially associated with the fourth accent.

7. The method of claim 6, wherein the input audio portion is determined to be substantially associated with the fourth accent based, at least in part, on a geographic location of a device that captures the input audio portion.

8. The method of claim 6, wherein the input audio portion is determined to be substantially associated with the fourth accent by at least partially matching one or more audio characteristics of the input audio portion to one or more fourth sample audio characteristics of audio samples associated with the fourth accent.

9. The method of claim 5, further comprising calculating at least one of a fast Fourier transform or mel-frequency cepstral coefficients associated with the input audio portion to identify one or more audio characteristics of the audio input portion.

10. The method of claim 5, wherein the third accent includes a neutral accent.

11. The method of claim 5, wherein the outputting comprises adjusting at least one of pitch, tone, stress, or melody of at least part of the input audio portion.

12. The method of claim 5, wherein the translation model is determined, at least in part, by one or more artificial neural networks.

13. The method of claim 5, wherein the input audio portion includes audio spoken by a first party during an audio communication session between the first party and a second party, and wherein the output audio portion is played to the second party during the audio communication session.

14. A non-transitory computer-readable medium having stored thereon a set of instructions, which if performed by a machine, causes the machine to perform operations comprising:
determining first combined audio characteristics of a first accent by combining first sample audio characteristics of audio samples associated with the first accent;
determining second combined audio characteristics of a second accent by combining second sample audio characteristics of audio samples associated with the second accent;
determining third combined audio characteristics of a third accent by combining the first combined audio characteristics of the first accent and the second combined audio characteristics of the second accent;
comparing the third combined audio characteristics of the third accent to other audio characteristics associated with one or more other accents;
generating a translation model between a fourth accent and the third accent;
receiving an input audio portion substantially associated with the fourth accent in a first spoken language; and
outputting, based at least in part on the translation model, an output audio portion substantially associated with the third accent in the first spoken language.

15. The non-transitory computer-readable medium of claim 14, wherein the operations further comprise determining that the input audio portion is substantially associated with the fourth accent.

16. The non-transitory computer-readable medium of claim 15 wherein the input audio portion is determined to be substantially associated with the fourth accent based, at least in part, on a geographic location of a device that captures the input audio portion.

17. The non-transitory computer-readable medium of claim 15, wherein the input audio portion is determined to be substantially associated with the fourth accent by at least partially matching one or more audio characteristics of the input audio portion to one or more fourth sample audio characteristics of audio samples associated with the fourth accent.

18. The non-transitory computer-readable medium of claim 14, wherein the operations further comprise calculating at least one of a fast Fourier transform or mel-frequency cepstral coefficients associated with the input audio portion to identify one or more audio characteristics of the audio input portion.

19. The non-transitory computer-readable medium of claim 14, wherein the outputting comprises adjusting at least one of pitch, tone, stress, or melody of at least part of the input audio portion.

20. The non-transitory computer-readable medium of claim 14, wherein the input audio portion includes audio spoken by a first party during an audio communication session between the first party and a second party, and wherein the output audio portion is played to the second party during the audio communication session.

* * * * *